United States Patent [19]

Weber

[11] Patent Number: 4,633,141

[45] Date of Patent: Dec. 30, 1986

[54] LOW VOLTAGE POWER SOURCE POWER INVERTER FOR AN ELECTROLUMINESCENT DRIVE

[75] Inventor: Paul J. Weber, Elgin, Ill.

[73] Assignee: Motorola, Inc., Schaumburg, Ill.

[21] Appl. No.: 706,818

[22] Filed: Feb. 28, 1985

[51] Int. Cl.$^4$ .......................... G05F 1/00; H05B 37/02; H05B 39/04; H05B 41/36

[52] U.S. Cl. .................................. 315/307; 315/169.3; 315/169.4; 315/242; 315/244; 315/291; 363/41; 340/781

[58] Field of Search ............... 315/307, 169.3, 169.4, 315/246, 291, 242, 241, 244; 340/781; 363/41

[56] References Cited

U.S. PATENT DOCUMENTS

| | | | |
|---|---|---|---|
| 2,937,298 | 5/1960 | Putkovich et al. | 313/108 |
| 3,026,440 | 3/1962 | Brainerd | 313/108 |
| 3,173,057 | 3/1965 | Thornton, Jr. | 315/244 |
| 3,749,977 | 7/1973 | Sliker | 315/169.1 |
| 4,220,896 | 9/1980 | Paice | 315/205 |
| 4,254,362 | 3/1981 | Tulleners | 315/219 |
| 4,259,614 | 3/1981 | Kohler | 315/219 |
| 4,414,493 | 11/1983 | Henrich | 315/219 |
| 4,443,741 | 4/1984 | Tanaka et al. | 315/307 |
| 4,459,516 | 7/1984 | Zelina et al. | 315/219 |
| 4,498,031 | 2/1985 | Stupp et al. | 315/219 |
| 4,535,399 | 8/1985 | Szepesi | 363/41 |

OTHER PUBLICATIONS

Endicott Research Group, Inc.; Catalog Sheet for E600 Series DC-to-AC Inverter; Effective 3/80.

Primary Examiner—Saxfield Chatmon
Attorney, Agent, or Firm—Rolland R. Hackbart; Raymond A. Jenski

[57] ABSTRACT

A power inverter for an electroluminescent device is disclosed which enables the electroluminescent device to be powered from a low voltage DC power source. Switching transistors convert the low voltage DC power to low voltage AC power which is subsequently increased and coupled to a resonant circuit including the electroluminescent device. Current in the resonant circuit is sampled, referenced to half the low voltage DC power, and coupled back in phase to an amplifier and switching transistors to create an oscillator which oscillates at a frequency determined by the resonant circuit.

14 Claims, 9 Drawing Figures

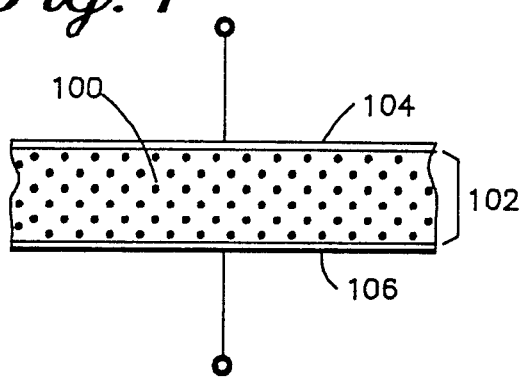
Fig. 1
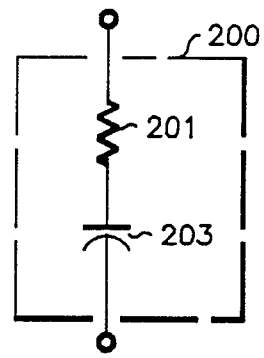
Fig. 2
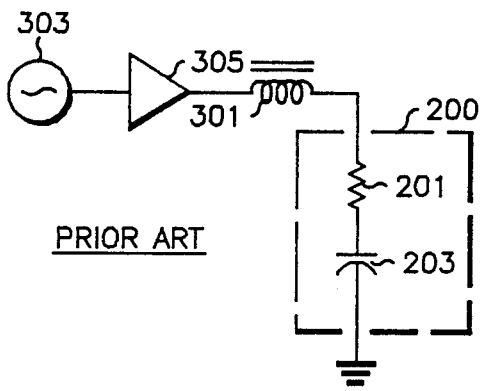
Fig. 3
PRIOR ART
Fig. 4
PRIOR ART
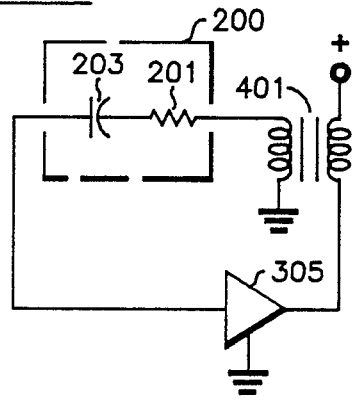
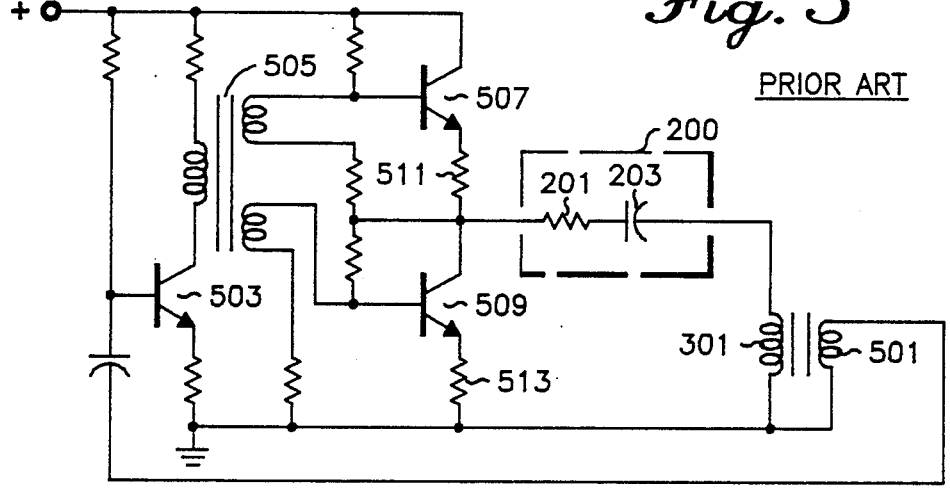
Fig. 5
PRIOR ART

LOW VOLTAGE POWER SOURCE POWER INVERTER FOR AN ELECTROLUMINESCENT DRIVE

BACKGROUND OF THE INVENTION

This invention generally relates to power supplies for electroluminescent (EL) devices and more particularly to a power inverter for low voltage direct current (DC) sources and which includes the EL device as part of an oscillator resonant circuit such that changes in EL capacitive reactance directly change the inverter oscillation frequency. The change in oscillation frequency compensates the change in EL capacitance and maintains a high light output.

Electroluminescent devices are generally constructed as planar light emitting sources with luminescent phosphors suspended in a dielectric material and energized by a high electric field. The electric field typically is applied by parallel conducting plates disposed on each surface of the planar dielectric material and coupled to opposite polarities of a voltage source. One of the plates is optically transparent or translucent so that light may escape from one surface of the planar device, thereby producing an essentially flat light source.

Such a flat light source has found application as a night light for home use and other low illumination applications. This light source has not found wider acceptance because of its inefficiency in converting electrical energy into light energy, its large capacitive reactance, and its variation in light output as the EL device aged.

Generally, the electrical energy applied to an EL device is alternating current (AC) electrical energy. Supplying the EL device from line current fixes the frequency of the AC energy. To improve the efficiency, others have used a reactance cancelling inductor so that a majority of the applied power would be delivered to the resistive component of the EL device. Additional efficiency has been achieved by increasing the electric field across the EL device by supplying power to the EL device at a frequency close to the resonance point of a moderate Q resonant circuit formed by the EL device capacitive reactance and the inductor. However, as the device capacitance changes with age, the resonance frequency of the resonant circuit moves away from the supplied power frequency and the light output diminishes considerably.

Powering the EL device from a direct current (DC) power source requires that the DC power be converted to AC power by means of a power inverter. Power inverters are well known and commercially available for many purposes. Typically, a power inverter switches or chops the DC power at a rate convenient for operation of AC devices—for example 60 Hz—and provides a switched AC output. To improve the efficiency of EL devices, under these circumstances the frequency of the power source has been made variable and dependent upon the capacitance of the EL device. In one previous embodiment, the switching rate of a DC power inverter is dependent upon the charge time of the EL device capacitance. In another, the current drawn by the EL device is detected and a control signal generated to vary the frequency of a controllable oscillator in order to hold the current constant.

None of these methods have yielded an efficiency or a constancy of light output which would enable the use of an EL device in a battery powered portable product. Such a product may use an EL device for the purpose of illuminating a telephone dial or other surface such as that envisaged in U.S. Pat. No. 4,206,501 assigned to the assignee of the present invention. The present invention produces the efficiency and constancy necessary for such illumination purposes.

SUMMARY OF THE INVENTION

Accordingly, it is one object of the present invention to improve the efficiency of an electroluminescent device by employing the inherent capacitive reactance in a resonant circuit of a power inverter.

It is a further object of the present invention to improve the constancy of the light output from an electroluminescent device by using the resonant circuit formed of the electroluminescent device capacitance and an inductor to directly determine the frequency of operation of the power inverter.

It is a further object of the present invention to sample the current in the resonant circuit such that no phase distortion is introduced in the sample signal which is part of the inverter oscillator feedback.

It is a further object of the present invention to enable a low voltage DC power source to be converted to high voltage AC power sufficient to cause an electroluminescent device to efficiently produce light.

These and other objects are accomplished in the present invention. This invention is a power inverter for an electroluminescent device which converts low voltage DC power into high voltage AC power suitable for the electroluminescent device. A switching means alternately switches between the positive and negative polarities of the low voltage DC power in response to an AC signal to generate low voltage AC power. This low voltage AC power is increased to a high voltage AC power while being coupled to a resonant circuit including the electroluminescent device. The resonant circuit comprises the electroluminescent device and means for conjugately matching the imaginary impedance of the electroluminescent device. The current in the resonant circuit is sampled and referenced to a fraction of the voltage of the low voltage DC power such that the sampled current may be fed back in phase with the high voltage AC power to generate the low voltage AC signal.

BRIEF DESCRIPTION OF THE DRAWINGS

FIG. 1 is a simplified representation of the construction of an electroluminescent device.

FIG. 2 is the schematic of an electrical model of an electroluminescent device.

FIG. 3 is a schematic diagram illustrating one conventional method of supplying power to an electroluminescent device.

FIG. 4 is a schematic diagram illustrating a conventional relaxation oscillator in which the electroluminescent device is part of the feedback network and, in part, determines the rate of oscillation.

FIG. 5 is a schematic diagram illustrating a conventional switching power inverter circuit in which high voltage DC power is converted to high voltage AC power at a frequency of oscillation determined by the capacitance of the electroluminescent device and the inductance of a feedback transformer.

DETAILED DESCRIPTION OF THE PREFERRED EMBODIMENT

Figure 6:
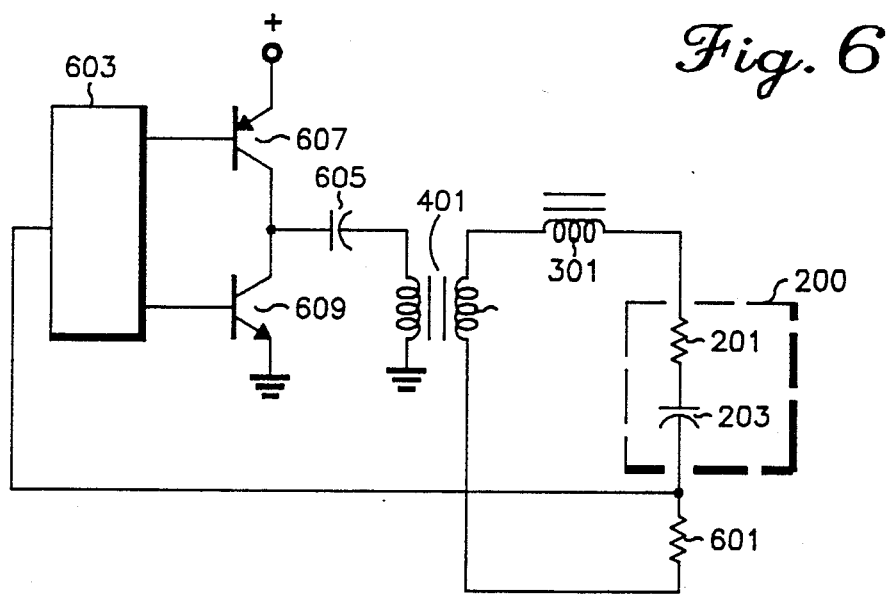
FIG. 6 is a simplified schematic diagram illustrating a switching power inverter circuit in which low voltage DC power is converted to high voltage AC power at a frequency of oscillation determined by the capacitance of the electroluminescent device and a resonating inductor and employing the present invention.

Electroluminescent devices offer a tremendous space advantage over other light sources when used as a back light for keyboards and other large flat areas. Because an EL device itself is generally constructed as a planar light emitting source, it is the only light source that is inherently free from "hot spots" (bright areas of illumination due to lamp filaments and other point sources of light).

The construction of an electroluminescent device is diagrammed in FIG. 1. Here, a large quantity of microscopic electrostatically luminescent phosphors 100 are suspended in a dielectric material 102 and may be energized by a high electric field. The electric field is developed between two parallel conducting plates, 104 and 106, disposed on each surface of the dielectric material 102. One of the conducting plates, for example, plate 104, is optically transparent or translucent thereby enabling light generated by the phosphors 100 to escape from the device.

Several major drawbacks have until now prevented the use of electroluminescent devices in mobile and particularly in portable equipment. These drawbacks in battery powered equipment include the high value of voltage required by the device as well as the inefficiency of the electric to light energy conversion, the highly reactive impedence of the electroluminescent device, and the degredation of light output as the EL device ages.

The primary supply of the electroluminescent device in the preferred embodiment is a five volt battery. A power inverter is used to convert the five volts DC to approximately 150 volts AC. The inverter and the highly reactive impedance of the electroluminescent device each contribute to the inefficiency of the energy conversion.

A first approximation of the reactive impedance of an electroluminescent device is shown in FIG. 2. This approximation is modeled as a resistance 201 and a capacitance 203 disposed in series. Typical values for a 50 square centimeter electroluminescent device, such as a 0334/508-31A available from Ball Engineering Corp., Westfield, Ind. would be a resistive component of 1000 ohms and a capacitive component of 2500 picofarads. To realize an efficient power transfer into the resistance 201, a conjugate impedance match is necessary to effectively cancel the series capacitance 203. In practice, this means using an inductor to tune out the capacitance. The conjugate match creates another problem, however; the load is frequency selective and power can be efficiently delivered only at the resonant frequency of the inductor and capacitor 203. Additionally, a change of between 30 and 50% occurs in the capacitance of capacitor 203 of the electroluminescent device due to ageing effects. In conventional circuits, the changing capacitance causes the frequency of resonance to deviate from the fixed frequency drive. The light output, then, drops considerably as the frequency of resonance changes.

A conventional electroluminescent driving circuit is shown in the schematic diagram of FIG. 3. A fixed inductor 301 is disposed in series with the electroluminescent device 200 and, as previously described, cancels the capacitive reactance of capacitor 203. Electrical energy from fixed frequency oscillator 303, after amplification by amplifier 305, is deposited primarily in the electroluminescent device real component 201 and light is generated.

With sufficient gain in amplifier 305 and a voltage step-up transformer 401, a relaxation oscillator may be created as shown in the schematic diagram of FIG. 4. Such a relaxation oscillator depends upon the power factor of the capacitive reactance 203 to determine the pulse rate of the oscillator and compensate for ageing changes in the capacitor 203. The light output efficiency, although more constant, remains relatively low.

A more sophisticated power inverter oscillator for an electroluminescent device is shown in FIG. 5. The capacitive reactance 203 and a series inductor 301 form the tank circuit of an oscillator such that the frequency of oscillation is directly dependent upon the capacitance value of capacitor 203. Feedback from the tank is accomplished by a winding 501 inductively coupled to series inductor 301, thereby forming a transformer. A transistor amplifier 503 drives a dual output phase inversion transformer 505 which, in turn, provides biphase outputs to switching transistors 507 and 509. Transistor 507 is caused to conduct during the positive half cycle of the oscillation signal and transistor 509 is caused to conduct to the negative half cycle. Thus, electroluminescent device 200 is alternately connected to the positive supply voltage through series resistor 511 and to ground through series resistor 513. The magnitude of the supply voltage for this circuit must be relatively high, however, since it must directly drive the electroluminescent device.

The task of the present invention is to provide approximately 3 foot lamberts of illumination with approximately 250 milliwatts of input power from a 5 volt battery while occupying less than one half a cubic inch of total volume. A simplified block diagram of a circuit employing the present invention is shown in FIG. 6. A voltage step-up transformer 401 preferably having a turns ratio of about 1:10 and low resistive and magnetic losses is employed in the preferred embodiment to enable operation from the low supply voltage. The matching inductance 301 and the transformer 401 dictate a relatively high frequency of oscillation in order to realize small physical size. The electroluminescent device 200, however, is more efficient at lower frequencies. In order to avoid audio interference with the primary functions of the mobile or portable device, it was elected in the preferred embodiment to operate at a frequency at about 3500 Hz. At this frequency a small value of inductance could be used to tune out the capacitive reactance 203 of the electroluminescent device. Small values of inductance requires fewer turns of wire thereby allowing a smaller overall size of inductor 301.

The inductor 301 and the capacitance 203 form a relatively high Q tuned circuit which provides a good match over a very limited frequency of operation range. Since, as described previously, the capacitance 203 varies as much 50% over the useful life of the electroluminescent device, either the frequency of oscillation or the value of inductance must change to compensate the changing capacitance. The best technique has proven to be changing the frequency of oscillation as the capacitor ages by placing the inductor 301 and the capacitance 203 in the tank circuit of the oscillator.

It is significant to note that it is not possible to simply use a voltage sample from across the electroluminescent device for feedback. At this point in the circuit, the phase shift is not zero at the desired resonant frequency. It is closer to 90 degrees since the tank circuit looks like a second order low pass filter. Therefore, when the feedback sample is taken from across the electroluminescent device 200, oscillation occurs at a much lower frequency than resonance because stray phase shifts due to AC coupling and higher gain satisfy the requirements for oscillation more readily.

Figure 7:
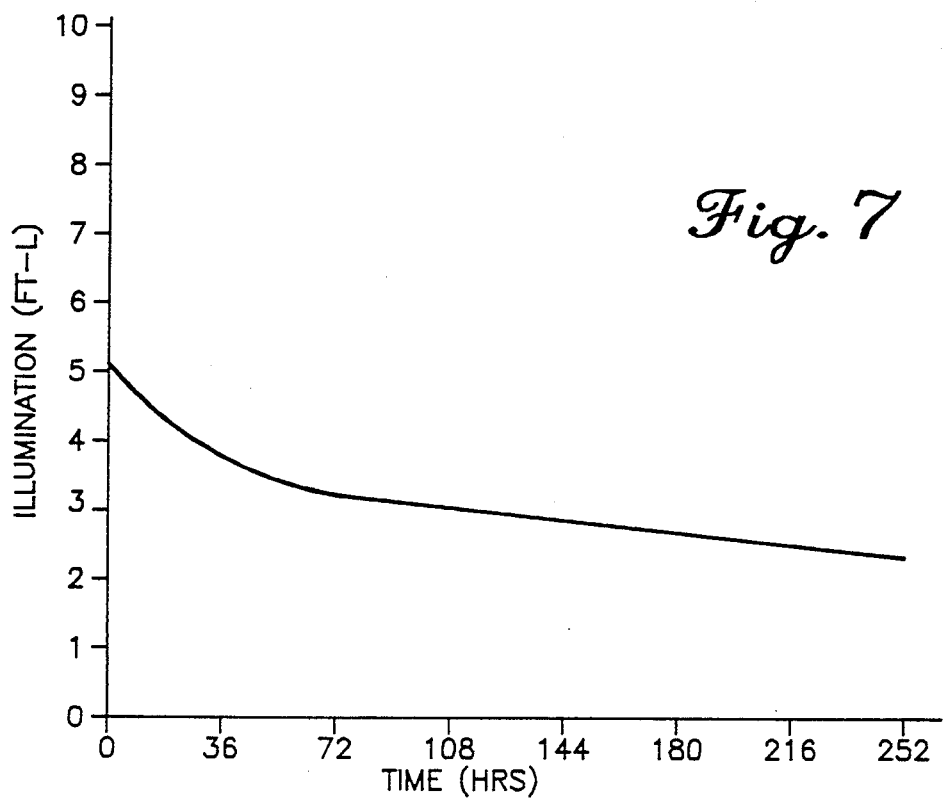
FIG. 7 is a graph illustrating the light output over time from an electroluminescent device powered by an inverter employing the present invention.

The solution to the feedback problem is to sample the current in the electroluminescent device 200 with a low value series resistor as shown by resistor 601 in FIG. 6. This point of feedback has zero phase shift and maximum sample voltage at the resonance frequency. The electroluminescent device 200 constantly operates in resonance because the frequency of operation is determined by capacitance 203 and inductance 301. At resonance, the electroluminescent device produces maximum light output which, in the preferred embodiment, is approximately 17 foot lamberts per watt at initial turn-on. The change in light output over time for the preferred embodiment is shown in FIG. 7.

Referring again to FIG. 6, the amplifier 603 and complementary symmetry output driver transistors (605 and 607) stages evolved from a single ended common emitter configuration that was discarded because of its lack of consistent output impedance and its requirement for direct current in the transformer 401 primary (which caused an additional magnetic flux density burden on an already critical transformer application). Class B complementary symmetry topology was used because, by its inherent nature, it could employ a DC blocking capacitor 605 to prevent DC in transformer 401, it would not waste energy by having both devices on at once, and it would not require a dual output phase inversion transformer and thus could be driven by a single square wave. One drawback to conventional class B topology is the loss resulting from its inability to swing the output closer than about 0.8 volts to the supply and ground rails. If a higher supply voltage were used, this would not be a problem, but, since the source voltage of the preferred embodiment is five volts, over 25% of the available power would be wasted in the output devices. In the configuration of the preferred embodiment, a complementary pair of common emitter connected switching devices is shown as transistors 607 and 609 in FIG. 6. This configuration improves the power loss in the class B topology to about 12% and creates a need for separate non-overlapping base drive signals.

Figure 8:
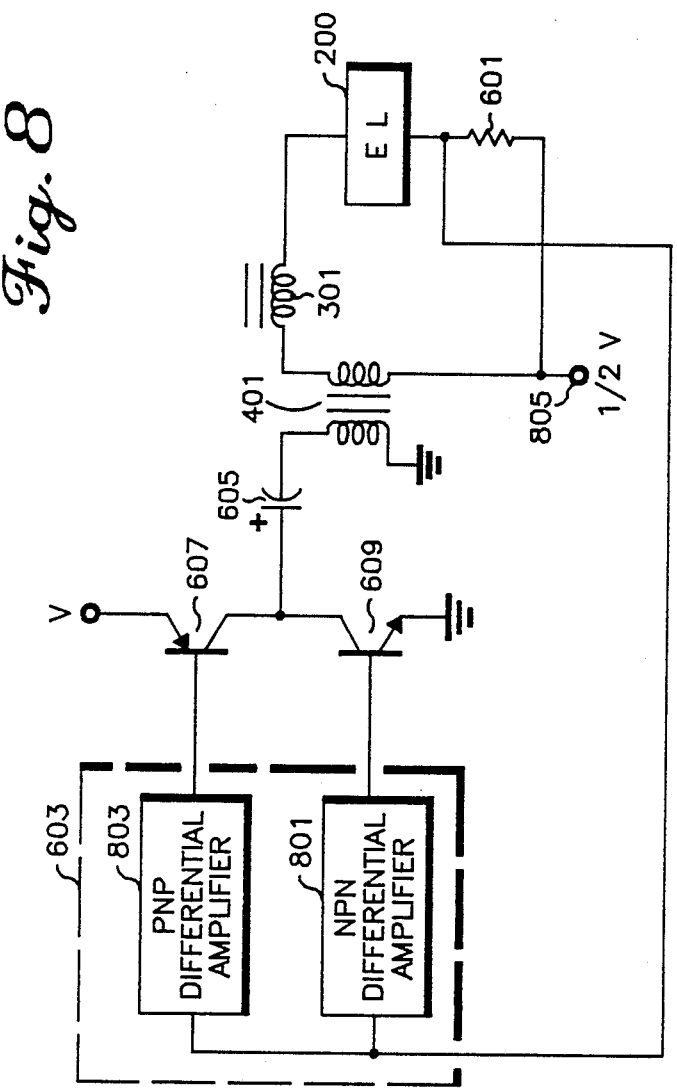
FIG. 8 is a schematic diagram of a power inverter employing the present invention and utilizing differential amplifiers driven by a feedback signal referenced to half the low voltage DC power.

To obtain the non-overlapping base drive signals, dual differential amplifiers of different transistor polarities are connected to the feedback signal and used to amplify positive-going and negative-going excursions of the oscillatory signal as shown in FIG. 8. An NPN differential amplifier 801 amplifies positive excursions of the oscillatory signal and couples the amplified signal to transistor 609 which saturates and pulls the DC blocking capacitor 605 to ground potential less $V_{CE}$ (SAT). A PNP differential amplifier 803 amplifies the negative-going excursions of the oscillatory feedback signal and saturates transistor 607 so that capacitor 605 is driven to the supply voltage (less the VCE (SAT)). The differential amplifiers 801 and 803 have slightly different input offsets which produce a "dead zone" in the transfer curve and thus guarantee a non-overlapping output waveform.

The output of driver transistors 607 and 609 are coupled to transformer 401 via capacitor 605, which in the preferred embodiment may be 10 microfarads or other large capacitance value such that no significant phase shift is introduced into the signal coupled to transformer 401.

The final electroluminescent device brightness (and power consumption) is determined by the turns ratio of the transformer, but maximum efficiency is a tradeoff between core losses, copper losses, and size. Since small size was predetermined, the tradeoff was between core materials and absolute number of turns, with a smaller number of turns resulting in higher flex density (and core losses) and a larger number of turns resulting in higher resistance loss in the windings. The design of transformer 401 in the preferred embodiment was a ⅜ inch diameter core made of "F" material with a permeability of 3000. The primary was of 96 turns of number 33 gage wire and the secondary was 800 turns of number 41 gage wire.

Similar tradeoffs were made for inductor 301. In the preferred embodiment, a ⅜ inch diameter toroid polypermalloy core with a permeability of 300 is used. Also, 1,550 turns of number 44 gage wire is wound on this core resulting in an inductance of 400 millihenries.

The feedback signal developed across resistor 601 is applied to the input of differential amplifiers 801 and 803. In order to avoid adding additional level shifting circuitry or a feedback transformer, the DC reference is taken at ½ the supply voltage. Thus, resistor 601 and transformer 401 secondary are returned to a reference which is approximately ½ the supply voltage and shown as point 805 in FIG. 8.

Figure 9:
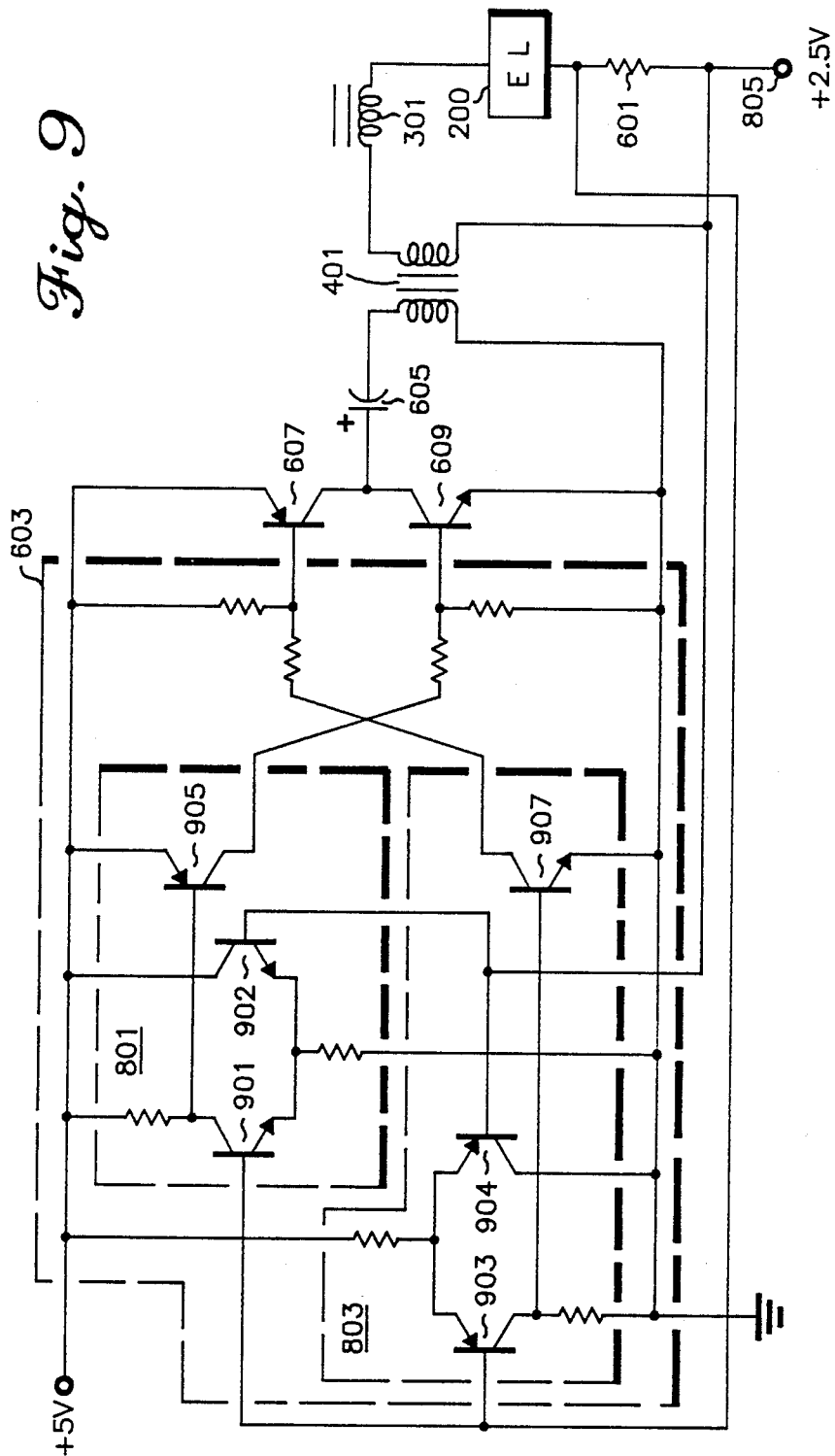
FIG. 9 is a detailed schematic diagram of the differential amplifiers and inverter circuitry of FIG. 8.

The reason for a ½ supply reference becomes apparent in FIG. 9. FIG. 9 is a schematic of an electroluminescent device power inverter which is suitable for at least portions of the circuit being implemented as an integrated circuit. Bias for NPN differential amplifier 801 transistors 901 and 902 is developed by the ½ supply reference. Similarly, the bias for PNP differential amplifier 803 transistors 903 and 904 is developed by the ½ supply reference. Although a voltage reference at ½ supply voltage is shown in the preferred embodiment using bipolar technology, other methods of realizing differential amplifiers, such as CMOS, may require fractional supply voltage references other than ½ the supply. The main objective in using a fractional supply reference is the avoidance of a phase-shift introducing DC block coupling capacitor. A voltage differential created across sampling resistor 601 due to the oscillating signal in the electroluminescent device 200 tank is coupled to the base of transistors 901 and 903 essentially in series with the ½ supply voltage bias. This feedback voltage from resistor 601 is not coupled to transistors 902 and 904. As described previously, positive oscillation signal excursions are amplified by differential amplifier 801 and negative-going excursions are amplified by differential amplifier 803. The output from differential amplifiers 801 and 803 are coupled via internal coupling transistors 905 and 907 to the switching transistors 609 and 607, respectively. Thus the oscillation feedback loop is completed.

In summary, then, an electroluminescent device power inverter has been shown and described which efficiently enables high light output to be generated for an extended period of time by an electroluminescent device from a low voltage DC power source. This is accomplished by placing the highly capactive electroluminescent device and a resonating inductor in the frequency determining tank of the power inverter oscillator. Low voltage AC power created by the inverter switching transistors is stepped-up by a transformer so that the necessary high voltage for the electroluminescent device is created. As the capacitance of the electroluminescent device changes, the frequency of oscillation of the inverter changes, thereby maintaining the resonance of the tank circuit. Feedback from the tank circuit is developed in-phase with the high voltage AC across a sampling resistor and referenced to ½ the DC supply voltage. The feedback signal is amplified and applied as non-overlapping positive and negative excursions at the frequency of oscillation to a class B common emitter complementary pair switch transistor arrangement. These switch transistors convert DC from the power source into the low voltage AC power, thereby completing the oscillator feedback loop. Therefore, while a particular embodiment of the invention has been described and shown, it should be understood that the invention is not limited thereto since many modifications may be made by those skilled in the art. It is therefore contemplated to cover by the present application any and all such modifications that fall within the true spirit and scope of the basic underlying principles disclosed and claimed herein.

I claim:

1. A power inverter especially suited for an electroluminescent device having an impedance of real and imaginary components, converting low voltage direct current (DC) power to high voltage alternating current (AC) power, comprising:
    means responsive to an AC signal, for alternately switching between positive and negative polarities of the low voltage DC power to generate low voltage AC power;
    means for conjugately matching the imaginary component of the electroluminescent device impedance to produce a resonant circuit;
    means for increasing the magnitude of said low voltage AC power to a high voltage and coupling said high voltage AC power to said resonant circuit;
    means, coupled to a fraction of the voltage magnitude of the low voltage DC power, for sampling the current in said resonant circuit and for generating a feedback signal in phase with said high voltage AC power; and
    means, responsive to said feedback signal, for generating said AC signal at a frequency determined by said resonant circuit.

2. A power inverter in accordance with claim 1 wherein said means for alternately switching between positive and negative polarities of the low voltage DC power source is at least two transistors of complementary polarity.

3. A power inverter in accordance with claim 2 wherein said complementary polarity transistors are connected collector to collector and at least one emitter is connected to the positive polarity of the low voltage DC power and at least one emitter is connected to the negative polarity of the low voltage DC power whereby the peak to peak voltage of said generated low voltage AC power is less than the voltage of the low voltage DC power by an amount equal to the collector emitter saturation voltage sum of said complemetary polarity transistors.

4. A power inverter in accordance with claim 1 wherein said means for conjugately matching the electroluminescent device imaginary inpedance is an inductor.

5. A power inverter in accordance with claim 1 wherein said means for increasing the voltage of said low voltage AC power and coupling to said resonant circuit is a transformer.

6. A power inverter in accordance with claim 1 wherein said means for generating said AC signal further comprises an amplifier for said feedback signal coupled to said means for alternately switching between positive and negative polarities of the low voltage DC power.

7. A power inverter in accordance with claim 6 wherein said amplifier further comprises at least one pair of differentially coupled transistors.

8. A power inverter in accordance with claim 1 wherein said means for sampling the current in said resonant circuit and generating a feedback signal is a resistor.

9. A power inverter for an electroluminescent device having an impedance of real and imaginary components, converting low voltage direct current (DC) power to high voltage alternating current (AC) power comprising:
    an inductor to conjugately match the imaginary component of the electroluminescent device and produce a resonant circuit;
    a resistor, coupled to said resonant circuit and essentially half the voltage magnitude of the low voltage DC power, to sample the current in said resonant circuit and generate an in-phase feedback signal;
    an amplifier to increase the magnitude of said feedback signal;
    at least two complementary polarity transistors coupled to said amplifier and utilizing said amplified feedback signal to control switching between positive and negative polarities of the low voltage DC power to generate low voltage AC power; and
    a transformer, coupled to said complementary polarity transistors, for stepping up the low voltage AC power to a high voltage and coupling said high voltage AC power to said resonant circuit, thereby completing an oscillatory loop with the frequency of oscillation determined by said resonant circuit.

10. A power inverter in accordance with claim 9 wherein said complementary polarity transistors are connected collector to collector and at least one emitter is connected to the positive polarity of the low voltage DC power and at least one emitter is connected to the negative polarity of the low voltage DC power whereby the peak to peak voltage of said generated low voltage AC power is less than the voltage of the low voltage DC power by an amount equal to the collector emitter saturation voltage sum of said complementary polarity transistors.

11. A power inverter in accordance with claim 9 wherein said amplifier further comprises at least one pair of differentially coupled transistors.

12. A method of converting low voltage direct current (DC) power to high voltage alternating current (AC) power for an electroluminescent device, comprising the steps of:
- alternately switching between positive and negative polarities of the low voltage DC power to generate low voltage AC power, in response to an AC signal;
- conjugately matching an imaginary component of the electroluminescent device impedance to produce a resonant circuit;
- increasing the magnitude of said low voltage AC power to a high voltage;
- coupling said high voltage AC power to said resonant circuit;
- sampling the current in said resonant circuit and generating a feedback signal in phase with said high voltage AC power and with reference to a fraction of the voltage magnitude of the low voltage DC power; and
- generating said AC signal at a frequency determined by said resonant circuit and in response to said feedback signal.

13. A method of converting low voltage direct current (DC) power to high voltage alternating current (AC) power for an electroluminescent device by causing oscillation, comprising the steps of:
- conjugately matching an imaginary impedance component of the electroluminescent device to produce a resonant circuit and determine the frequency of oscillation;
- sampling the current in said resonant circuit and generating a feedback signal in phase with said high voltage AC power and referenced to essentially half the voltage magnitude of the low voltage DC power;
- amplifying the magnitude of said feedback signal;
- alternately switching between positive and negative polarities of the low voltage DC power to generate low voltage AC power in response to said amplified feedback signal;
- increasing the magnitude of said low voltage AC power to a high voltage;
- and coupling said high voltage AC power to said resonant circuit, thereby completing the loop of oscillation.

14. A power inverter for an electroluminescent device converting low voltage direct current (DC) power to alternating current (AC) power employing a resonant circuit of an inductor conjugately matching the imaginary impedance component of the electroluminescent device, an amplifier responsive to a feedback signal, and at least two switching transistors coupled to the amplifier for switching between positive and negative polarities of the low voltage DC power to generate low voltage AC power and coupled to the resonant circuit such that an oscillator is formed oscillating at the frequency of the resonant circuit, characterized by:
- means, disposed between the switching transistors and resonant circuit, for increasing the magnitude of the low voltage AC power to produce high voltage AC power; and
- means, coupled to a fraction of the voltage magnitude of the low voltage DC power, for sampling the current in the resonant circuit and generating the feedback signal related to said sample in phase with the high voltage AC power.

* * * * *